Patented Aug. 31, 1943

2,327,992

UNITED STATES PATENT OFFICE 2,327,992

PROCESS FOR THE PREPARATION OF COMPOUNDS OF CERIUM

Joseph Blumenfeld, New York, N. Y.; vested in the Alien Property Custodian

No Drawing. Application April 1, 1939, Serial No. 265,602. In France April 13, 1938

3 Claims. (Cl. 23—22)

It is well known that the best method of industrially preparing compounds of cerium, free or practically free from compounds of other and especially coloured rare earth metals, consists in hydrolysing a solution of nitrates in which cerium is present in the tetravalent form, whereas the other rare earth metals are trivalent. In this case only hydrated ceric oxide precipitates, while the other rare earth metals remain dissolved, at the end of the hydrolysis in the acid mother liquor.

It is equally well known that the ceric oxide ($CeO^2$) obtained from the precipitate after adequate washing and calcination at an appropriate temperature, forms an excellent opacifying agent for many industrial uses, and in particular for vitreous enamels.

A disadvantage of this process is the large consumption of nitric acid which it entails. It has been proposed to recover the nitrate ion present in the acid mother-liquors by converting it into nitrates of alkaline earth metals, which are subsequently employed in the preparation of a further quantity of rare earth nitrates from their sulphates by double decomposition.

Such a process is naturally dependent on the oxidation in acid solution of cerous to ceric nitrate, an operation which it may be advantageous to avoid; moreover special conditions are necessary for the double decomposition of the alkaline earth nitrates and the rare earth sulphates.

The present invention has for its object a process which permits not only of obtaining the optimum conditions for hydrolysis so as to produce ceric oxide irreproachable from the point of view of its industrial utilisation, but also results in considerable economies owing to the fact that the mother liquors of dilute nitric acid after hydrolysis contain only small quantities of trivalent rare earth-metals, thus allowing their reuse.

When operating according to the present invention, one prepares, according to known manner, for example by the action of caustic soda on the rare earth sulphates, the hydroxides of the rare earth metals. These hydroxides are then submitted to a process of oxidation, which presents no difficulty, in order to transform the cerium to the tetravalent state. For example drying the said hydroxides in an oven results in oxidising almost all the cerium present to ceric oxide, this oxidation being caused by the oxygen of the air.

The product so obtained is next treated, preferably in the cold, by a weak or dilute acid so as to dissolve only the trivalent rare earth metals, which are distinctly more basic than cerium in the ceric form, and thus are the first to pass into solution.

To attain this desired end, one can for example suspend the hydroxides in water to which dilute hydrochloric acid is slowly added in small portions at a temperature sufficiently low to ensure that only a relatively slight proportion of the ceric oxide present is reduced to cerous salts. The slow addition of acid is continued only so long as the trivalent metals continue to pass into solution, and is stopped immediately it is found that a fresh small addition of acid dissolves no more solid. The use of coloured indicators, such for example as Congo red, can be used to aid in the determination of the end point of the reaction.

One thus obtains a solution containing substantially all the trivalent rare earth metals, while substantially all the cerium present remains in the insoluble residue in the tetravalent state. One only needs to separate the solution from the residue by filtration and washing in order to obtain ceric oxide, contaminated with only small quantities of other rare earth metals, while the trivalent rare earth metals remain in the solution from which they can easily be recovered.

Instead of hydrochloric acid, one can also employ for this extraction nitric or any other acid capable of forming soluble salts of the trivalent rare earth metals under the prevailing conditions of the reaction, without injuriously affecting the ceric compound.

The raw hydrated ceric oxide so obtained is dissolved in concentrated nitric acid which transforms it into ceric nitrate. It is preferable to carry out this operation under such conditions as ensure that the solution remains as free as possible from colloids. This result can be achieved, for example, by introducing the raw hydrated ceric oxide in small portions into concentrated nitric acid at a temperature sufficient to ensure terminating the reaction, without however exceeding the temperature at which reduction of the cerium from the ceric to the cerous state commences.

The solution of ceric nitrate is then hydrolysed by any known means, such for example as introduction into boiling water to which a little sulphuric acid has been added.

After separating the mother liquor and washing, the precipitate can be calcined and used for opacifying enamel. Having been precipitated from a solution containing but little foreign impurities, the purity of the precipitate is high and it is perfectly fitted to serve all those uses where a high grade of purity is required.

The mother liquors containing nitric acid together with only small quantities of salts are concentrated, and the nitric acid so recovered serves for dissolution of another batch of ceric oxide prepared according to the invention. It is only after a number of operations, which may be extremely large, that it is necessary to eliminate these liquors as a result of the gradually rising content of impurities. The nitric ions in the mother liquor may then be recovered in any known way, as for example by transformation into alkaline-earth nitrates, as described in British Patent No. 470,187, corresponding to U. S. Patent No. 2,166,702.

The mother liquors can also be reused without previous concentration, to extract the trivalent rare earth metals for the preparation of the raw hydrated ceric oxide as previously described.

By way of example, two modes of putting the said invention into effect are described:

No. 1.—(a) The rare earth hydroxides are treated with dilute hydrochloric acid, thus obtaining a residue of raw hydrated ceric oxide and a solution of the trivalent rare earth metals. (b) The residue is washed with an alkaline solution in order to eliminate the chlorine ions present. (c) The washed residue is dissolved in concentrated nitric acid. (d) The ceric nitrate so obtained is hydrolysed. (e) The mother liquors from the hydrolysis are concentrated and reused for the dissolution of a fresh portion of the residue as in (c).

No. 2.—(a) The rare earth hydroxides are treated with the dilute nitric acid obtained under 2 (d), without previous concentration. One thus obtains a residue of raw hydrated ceric oxide and a solution of the trivalent rare earth metals. (b) The residue is dissolved in concentrated nitric acid. (c) The ceric nitrate so obtained is hydrolysed. (d) The mother liquors from the hydrolysis are reused, after thorough decantation but without previous concentration, in 2 (a).

In this case the nitric ions remaining in the mother liquors containing the trivalent rare earth metals may be recovered as metallic nitrates, for example as alkaline earth nitrates.

Working example.—58 kgs. of stoved hydroxides of the cerium group of rare earth metals were treated with dilute-hydrochloric acid so as to dissolve the maximum quantity of trivalent rare earth metals without dissolving the tetravalent cerium. These 58 kgs. had the following composition:

| | Per cent |
|---|---|
| Total oxides | 82.35 |
| Total cerium (expressed as $CeO^2$) | 41.8 |
| Tetravalent cerium (expressed as $CeO^2$) | 40.9 |
| $\dfrac{SO_3}{\text{Total oxides}}$ | 1.85 |

In this treatment, 49.4 kgs. of hydrochloric acid were used having a concentration of 380 gr. per litre (i. e., about 32.6%).

The hydroxides were suspended in 230 litres of water, and the above quantity of hydrochloric acid of the above indicated concentration diluted in 180 litres of water, was slowly introduced little by little, while subjecting the mixture to constant stirring. It is essential that the hydrochloric acid should be added slowly and progressively so as to avoid any local excess of acidity which might reduce tetravalent to trivalent cerium.

Final volume obtained, 420 litres.

Next the liquor was filtered so as to separate the raw hydrated cerium oxide from the solution containing the great majority of the trivalent rare earth metals. It was then washed with water, and next with 2 kgs. of caustic soda dissolved in 200 litres of water, in order to free it from retained chlorine ions. Finally it was again washed with water till no chlorine could be detected in the filtrate, and the cake dried.

58 kgs. of wet raw hydrated ceric oxide were obtained, the oxide content being approximately 45%.

These 58 kgs. of cake were dissolved in 58 kgs. of nitric acid 39–40° Bé., and the temperature was allowed to rise to 55° C., the reaction vessel being heat insulated so as to obviate losses of heat.

The solution thus obtained, which is practically free from colloids, was subjected to hydrolysis. 300 litres of water were placed in a container of 500 litres capacity, and brought to the boil by the injection of steam, 2400 c. c. of sulphuric acid of a concentration of 700 grammes per litre were added, and then, whilst continuing to heat the solution directly with steam, the red solution of ceric nitrate prepared as described above was introduced slowly, so that its introduction required half an hour.

The heating with steam was then stopped and the precipitate allowed to settle.

The mother-liquor was then syphoned off and the ceric oxide placed on a vacuum filter and washed with water until all the coloured rare earth metal ions were eliminated.

After washing and drying the cake on the filter, it was then dried in an oven at 100°, and calcined.

The mother-liquor, carefully decanted, can be reused for the preparation of a fresh batch of raw hydrated ceric oxide.

In the above description the terms "hydroxide" and "hydrated oxide" are used without any specific distinction, and it is not intended that any chemical inference should be drawn as to whether the chemical compounds are true hydroxides in the strict sense, or are in the form of hydrated oxides. Recent research has made probable that of the rare earths only lanthanum forms a true hydroxide, but it is not the desire of the inventor to draw any hard and fast lines or conclusions.

I claim:

1. A process of preparing a cerium compound from a mixture of rare earth metal hydroxides which comprises oxidizing the cerous hydroxide in said mixture to the ceric state, then reacting with an acid selected from the group consisting of hydrochloric acid and nitric acid upon the trivalent rare earth metal hydroxides in such mixture while suspended in several times its own weight of water to convert such trivalent rare earth metal hydroxides substantially all into soluble salts while leaving substantially all of the hydrated ceric oxide chemically unchanged, separating the solution of trivalent rare earth metal salts from said hydrated ceric oxide, and thereafter reacting upon said hydrated ceric oxide with nitric acid to obtain a solution of ceric nitrate, substantially without reduction, and hydrolyzing the solution so formed in water containing some sulphuric acid.

2. In a treatment of rare earth compounds, the herein described improvement which comprises treating a mixture of the hydrated rare earth metal oxides suspended in several times its own weight of water, with acid in so diluted a condition that the hydrated oxides of the rare earths other than cerium are substantially all dissolved while the hydrated ceric oxide is left substantially unaltered, separating the solution from the residue, treating the residue with strong nitric acid while the temperature rises to about 55° C., and thereby forming an acid solution of ceric nitrate, adding such solution, while substantially free from colloids to several times its own bulk of boiling water acidified with sulphuric acid, whereby hydrolysis is effected and the cerium is substantially all precipitated, and collecting said precipitate and calcining it.

3. A process as covered in claim 2, followed by reuse of the final mother liquor in the first step of said process.

JOSEPH BLUMENFELD.